United States Patent [19]
Gordon et al.

[11] 3,857,634
[45] Dec. 31, 1974

[54] DEVICE FOR SOLVING THE SONAR EQUATION

[75] Inventors: Alan Gordon; Michael W. Phelps, both of San Diego, Calif.

[73] Assignee: The United States of America as represented by the Secretary of the Navy, Arlington, Va.

[22] Filed: Feb. 13, 1974

[21] Appl. No.: 442,303

[52] U.S. Cl. ............................................... 355/18
[51] Int. Cl. ........................................... G03b 27/32
[58] Field of Search ................................ 355/70, 18

[56] References Cited
UNITED STATES PATENTS
2,206,396  7/1940  Glass et al. ..................... 355/70

Primary Examiner—John M. Horan
Attorney, Agent, or Firm—Richard S. Sciascia; Ervin F. Johnston; William T. Skeer

[57] ABSTRACT

An optical simulation device for solving the sonar equation comprises a light table for establishing a predetermined light field and a plurality of optical graticules to modify the light energy from the light table. A detection means mounted above the light table and movable through predetermined coordinates with radiation thereto completes the simulation device.

6 Claims, 3 Drawing Figures

PATENTED DEC 31 1974 3,857,634

DEVICE FOR SOLVING THE SONAR EQUATION

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of computational devices. More particularly, this invention pertains to computational devices adapted to solve problems in compressional energy transfer. In still greater particularity, this invention pertains to a computational device for use in solving problems dealing with acoustic propogation. By way of further characterization, this invention relates to a computational device particularly adapted for use in sonar detection predictions. In still greater particularity, this invention provides an optically operated computational device for use in determining the probability of detection of surface vessel by passive receivers.

DESCRIPTION OF THE PRIOR ART

The sonar equation, which relates the various parameters of acoustic importance, is generally recognized as a major tool for predicting acoustic detectability. Generally, this equation is solved for each particular incident for which acoustic detectability information is desired. In the past, this equation was solved by using conventional computational means available to the location where the solution is desired, generally on board Naval vessels. Thus, the solution is customarily solved by laborious hand computations, or, in some instances, in elaborate computer programs.

Hand computation is, of course, long and tedious, especially if a large variety of ships, ranges, and propagation conditions are to be considered. Similarly, the use of shipboard computers is expensive and prevents the computer from being used for other shipboard functions. Both of these computational systems have the disadvantage that the result obtained by the various calculations is a series of numbers which must be compared, one with the other, and with relative standards to obtain some notion of the likelihood of acoustic detection.

Nomograms have been used to speed up hand calculations, but suffer the disadvantage that they are limited in the range of input values that they can accommodate and suffer from the lack of precision inherent in graphical solutions.

Although modern computers allow visual output at a display of solutions the capital costs in installing this type display, the training of personnel to utilize it effectively, and the restrictions placed on other computer processes, as noted above, render this type of solution impractical for shipboard applications.

Further, all of the above devices and, in fact, all known methods require separate computations to determine the detection probability for each hypothetical location of the threat sensor. Since, in general, the operator has no prior knowledge of the threat sensor's location, or where the threat sensor's location may produce optimum efficiency, the computation must be made for each range-azimuth bin. Thus, the computation time goes up linearly with the number of range-azimuth bins. Also, when dealing with a multi-ship task force, present methods require a separate computation for each range bin to obtain the resultant intensity of detectable sound from the entire task force.

From the foregoing discussions, it may be seen that the computation to determine probability of detection becomes so time consuming in a multi-ship task force and in a Naval situation, where the respective ships are in nearly continuous motion, both on the surface of the sea and relative to one another, that accurate determination is practically impossible to obtain. Thus, a need is created for a rapid determination of solutions to the sonar equation which permit rapid visual analyzation of areas having high detection probability and showing locations of these areas.

SUMMARY OF THE INVENTION

The present invention utilizes close analogy between the propagation of light through a shaded graticule and the propagation of sound through water to achieve a solution of the sonar equation. This utilization is effected by using a light table and a plurality of shaded transparencies to be placed in superposition on the light table and a movable detection source having a light sensitivity corresponding to the detection probability curve. Thus, the invention utilizes the parallel processing capability of a light beam in implementing the analogy between quadrature addition of light and sound fields.

STATEMENT OF OBJECTS OF INVENTION

It is accordingly an object of this invention to provide an improved computational device.

Another object of this invention is to provide an optical simulation device for acoustic technology.

Another object of this invention is to provide a computer having parallel processing capability.

Yet another object of this invention is to provide an optical acoustic field simulator for solving the sonar equation.

Still another object of this invention is to provide an optical computer having a predetermined light field modified by graticules corresponding to acoustic phenomena.

Yet another object of this invention is to provide an optical computer for solving the sonar equation capable of solutions for single ships as well as multi-ship task forces.

These and other objects of this invention will become more apparent from the ensuing specification when taken with the drawings.

DESCRIPTION OF THE PREFERRED EMBODIMENT

Figure 1:
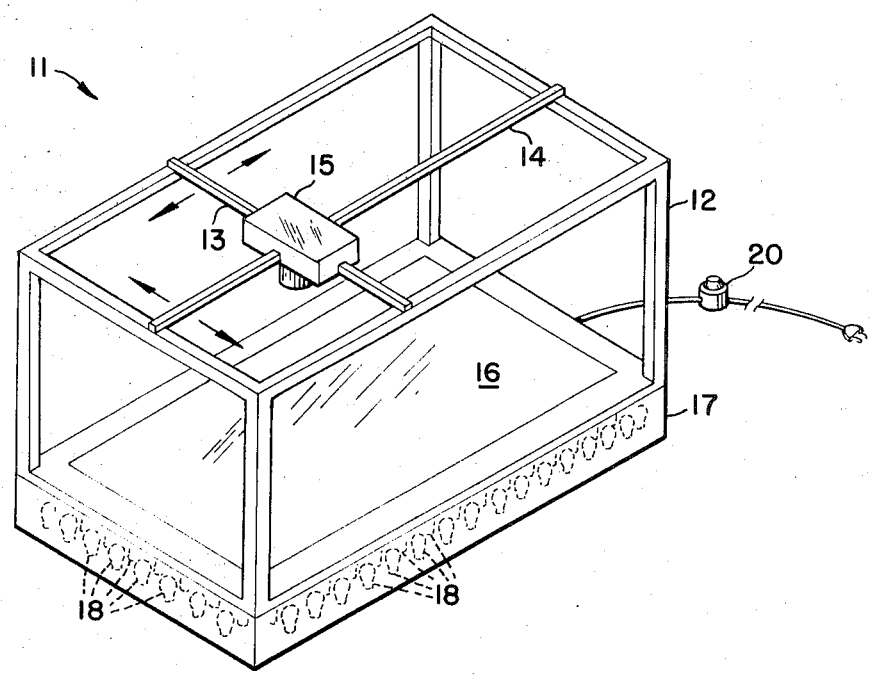
FIG. 1 is an illustration of the device of the invention.

Referring to FIG. 1, the optical simulation device is indicated generally at 11. A framework 12 forms an open, generally rectangular support means which carries on its upper surface adjustable supports 13 and 14. As indicated by the double headed arrows, support 13 and 14 may be moved along framework 12 such as to carry a light sensitive device 15 to any desired position.

Framework 12 may be made of aluminum angle or other such rigid material. Similarly, supports 13 and 14 may be mechanically attached to framework 12 with conventional mechanical means such as pinion gears meshed in a toothed rack carried by framework 12.

Light sensitive device 15 advantageously comprises a camera, as will be more completely described.

A plurality of optical graticules 16 are placed on the upper surface of a light table 17 to be illuminated thereby. Light table 17 includes a plurality of electrical lamps, indicated at 18, which provide a uniform light field. The power to operate electric lamps 18 may be obtained from any conventional electrical source. If desired, electric lamps 18 may be controlled in brightness by means of a suitable electrical control, indicated generally at 20, which may be an auto transformer or a resistance placed in electrical series connection with the light source.

Figures 2, 3:
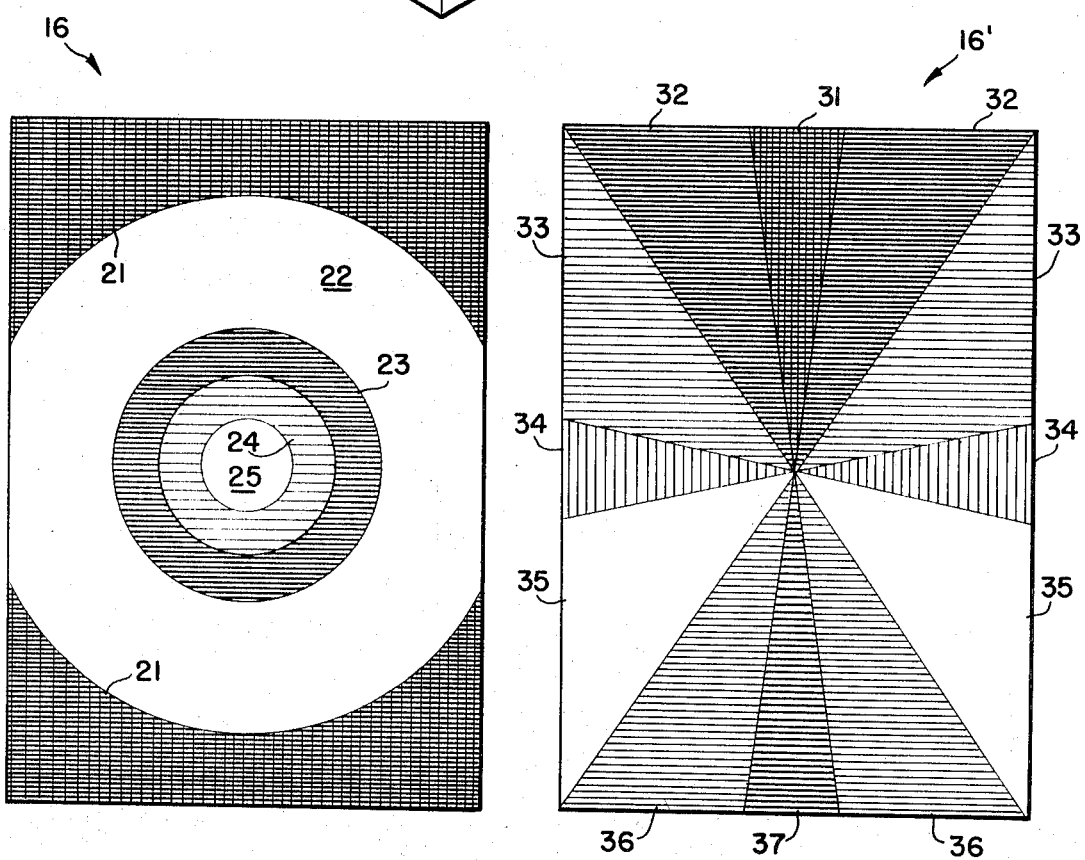
FIG. 2 is an illustration of one of the graticules used in the invention.
FIG. 3 is an illustration of another type of optical graticule used in the invention.

Referring to FIG. 2 an illustration of an optical graticule to be placed on a light table 17 is shown. As illustrated, graticule 16 is azimuthally symmetric and represents the propagation loss corresponding to measurements taken in particular ocean environments. It will be observed, that an outer band 21 is relatively dark in comparison to a concentric central band 22 which is lighter and in turn surrounds a band 23 which is considerably darker which, in turn, encloses bands 24 and 25. The variations of dark bands and light bands is accounted for by the convergence effects in an ocean environment. For a more complete discussion of this phenomena which gives rise to the particular shading used in the graticules, reference is invited to *Physics of Sound in the Sea*, printed by the Department of Navy, Headquarters Naval Material Command, Washington, D.C. 20360, 1969. This useful book is available from the Superintendant of Documents U.S. Government Printing Office, Washington, D.C. as NAVMAT P–9675.

Referring to FIG. 3, another graticule 16' is illustrated and represents the radially independent transparency zones which correspond to the sound level as a function of azimuth in relation to a Naval vessel. As shown, a series of azimuthally symmetric zones radiate outwardly from a central region representing the location of the marine vessel to indicate the relative sound intensities emitted from the vessel into the water. The various areas, represented at 31 through 37, indicate that the sound intensity is at a maximum, i.e., minimum opacity, athwart the vessel and diminishes in a predictable manner to a minimum level forward and increases again as the opposite side of the ship is approached.

When graticules 16 and 16' are superposed, a light pattern results which is analogous to the sound levels within the body of water for which graticule 16 was prepared. It may also be desirable to introduce other graticules which represent spatially independent factors such as sea state, for example. This may be accomplished by using a third set of uniformly shaded graticules or by adjusting the intensity of light sources 18 by means of control 20.

Thus, it may be seen that the light illuminating upwards from light table 17 is analogous to the propagation of sound through the water. That is, the intensity of the light which is passed through these series of graticules 16, 16' and other non-spatial graticules which may be employed is analogous to the multiplication and division of terms, i.e., the addition and subtraction of decibels, in the sonar equations. Secondarily, it may be possible to combine several images illuminated in parallel to correspond to the addition in quadrature of the incoherent sound fields from several of these sources, however a series technique, to be described, is preferred. Thus, a useful simulation of the acoustic field can be obtained by a projector lens in a plane parallel to and positioned above light table 17. Of course, this plane is determined by the physical dimensions of the support means and the optical characteristics of the lens.

A third analogy makes the device useful as an analytical tool. This analogy is the spectral sensitivity curve of photographic film which resembles the sigmoid shape which is the shape of the probability of detection curves for most acoustic detection devices. In particular, those spectral curves corresponding to high-contrast pancromatic photographic film have been shown to be an accurate approximation.

Thus, light detection device 15 may be advantageously a photographic camera of the type used to photograph oscilloscope faces. Since such cameras and film emulsions are well known in the art, a further description thereof is not deemed necessary for the complete understanding of the instant invention.

Although the foregoing discussion is obviously sufficiently complete to enable a person skilled in the sonar, electroacoustic arts to make and use the invention, this construction and use will be further facilitated by reference to the preferred mode of operation.

MODE OF OPERATION

Each of the graticules 16 and 16' is designed such that the length and width of the graticule corresponds to the length and width of a geographical area with a given scale factor, i.e., 1 inch equals 10 nmi. The shading on each graticule 16, as previously described, is chosen such that the optical density of each point is proportional to the decibel representation of the associated acoustic term. Assuming that the invention will be operated with three sets of graticules, the first set of graticules describes the variation of source level with azimuth those directions of maximum source level being the most transparent. Of course, different graticules of varying intensities would be used for different ships. The second set of transparancies describes the propagation loss as a function of distance with lighter shadings corresponding to lower propagation loss, i.e., higher sound level. Of course, a selection of various transparancies would be made corresponding to the various commonly encountered propagation conditions occuring in the ocean. Each of the third set of graticules would be uniformly shaded ranging from very clear to very opaque. The choice of one of these graticules in a given solution would be determined by a nomograph dependent upon sea states, recognition differentials, directuity index, and other parameters.

The solution to the sonar equation, $R_L = SL - P_{Loss}$ where $R_L$ is the received sound level and $SL$ is the source sound level and $P_{Loss}$ is the propagation loss. The solution of this equation is affected by chosing one transparency or graticule from each subset according to the desired input parameters and stacking them one upon the other on the light table. The resulting optical intensity emerging from each point on the stack will then be proportional to the acoustic intensity at the corresponding spatial point. This light field may be then either viewed directly, projected on a screen, or preferably, photographed. The calibration of the photograph is accomplished by including a gray level tone scale on each of the transparancies so that quantitative information would be available. Of course, other independent means such as densitometers may be employed.

The computation of a total acoustic field from a task force may be obtained by forming and illuminating a stack corresponding to a given ship and exposing the film in camera 15 for a predetermined length of time. The the camera is translated by means of movable supports 13 and 14 a distance corresponding to the scaled distance between the two ships. A stack is then formed which represents the second ship and the same film is exposed for the same length of time. This process is repeated until each ship in the convoy is accounted for.

By choosing the film and exposure parameters properly, the resultant optical density at each point will be proportional to the acoustic signal-to-noise ratio at a corresponding geographic point. By choosing a higher contrast film the optical density will be simply related to the detection probability. As previously pointed out, this is because the density versus the log exposure curves of high contrast films are similar in shape to the probability of detection versus signal to noise curves of most acoustic detection devices.

From the foregoing discussions it may be seen that the device of the invention is capable of parallel processing of a light beam whereas previous devices used only serial processing. Thus, with the present device only one operation is needed for all range-azimuth bins as opposed to a separate operation for each bin. In representative cases where perhaps 100 range bins and 100 azimuth bins would be used, this amounts to a 10,000 fold savings in operation time. Additionally, the read-out from the above system is an easily understood intensity plot showing locations where detection is enhanced. Because no computations or complex programming are required the device is relatively simple to operate and free from human introduced error.

The foregoing description taken together with the appended claims constitutes a disclosure such as to enable a person skilled in the acoustic and sonar arts and having the benefit of the teachings contained herein to make and use the invention. Further, the structure herein described meets the objects of invention, and generally constitutes a meritorious advance in the art unobvious to such a person without the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. A simulation device for solving the sonar equation to establish the likelihood of acoustic detection of a marine vessel comprising:
    means to establish a light field of a predetermined intensity distribution;
    first light modifying means supported by said light field establishing means and having azimuthally symmetrical areas of predetermined optical density corresponding to acoustic transmission properties of a fluid medium for altering the light field intensity;
    second light modifying means supported by said light field establishing means in cooperative juxtaposition with said first light modifying means and having radial symmetrical areas of predetermined optical density corresponding to acoustic propagation zonal patterns emanating from the marine vessel for altering the light field intensity;
    support means attached to said light field establishing means and extending generally away therefrom in the direction of propagation of said light field for establishing a datum plane within said light field as altered by said first and second light modifying means; and
    light sensitive means for responding to the light field and effectively connected to said support means to be positioned to intercept the altered light of said light field in said datum plane at a predetermined position and having a light sensitivity curve which is shaped similar to the detection probability curve of acoustic detection of the marine vessel.

2. A simulation device according to claim 1 wherein said light field establishing means includes a third light modifying means to be supported thereby and having a uniform optical density.

3. A simulation device according to claim 1 in which said first and second light modifying means include geometric patterns having differing light transmission characteristics.

4. A simulation device according to claim 1 in which said light sensitive means is connected to said support means by a movable stage to permit selective movement of its interrupting position to a plurality of predetermined areas within the datum plane.

5. A simulation device according to claim 4 in which said light sensitive means includes a photographic camera.

6. A simulation device according to claim 5 in which said photographic camera further includes a high-contrast photographic film.

* * * * *